United States Patent
Nelles et al.

(10) Patent No.: US 11,424,971 B2
(45) Date of Patent: Aug. 23, 2022

(54) CONTROL UNIT FOR GENERATING PWM PULSES FOR AN INVERTER

(71) Applicant: Dr. Ing. h.c. F. Porsche Aktiengesellschaft, Stuttgart (DE)

(72) Inventors: Robert Nelles, Stuttgart (DE); Jan Naegelkraemer, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 17/363,026

(22) Filed: Jun. 30, 2021

(65) Prior Publication Data
US 2022/0014402 A1 Jan. 13, 2022

(30) Foreign Application Priority Data
Jul. 7, 2020 (DE) .................... 10 2020 117 821.2

(51) Int. Cl.
*H04B 15/00* (2006.01)
*H04L 27/12* (2006.01)

(52) U.S. Cl.
CPC ............. *H04L 27/12* (2013.01); *H04B 15/00* (2013.01)

(58) Field of Classification Search
CPC ...... H04L 27/12; H04L 25/4902; H04B 15/00; H02M 7/53873; H02M 7/5395; H02M 1/0025; H02M 1/12; H02P 27/085; B06L 15/00
See application file for complete search history.

(56) References Cited

U.S. PATENT DOCUMENTS

| | | | | |
|---|---|---|---|---|
| 5,610,806 | A * | 3/1997 | Blasko ............... | H02M 7/5395 363/41 |
| 5,850,132 | A * | 12/1998 | Garces ................. | G05B 11/28 318/400.11 |
| 7,190,135 | B2 * | 3/2007 | Collier-Hallman ......................... | B62D 5/0463 318/599 |
| 7,265,514 | B1 * | 9/2007 | Horng ...................... | H02P 6/08 318/400.01 |
| 2014/0266488 | A1 * | 9/2014 | Bors ........................ | H03K 7/08 332/109 |
| 2017/0366130 | A1 * | 12/2017 | Hollenbeck ........... | H02P 27/085 |
| 2018/0191284 | A1 * | 7/2018 | Wu ......................... | H02P 27/08 |

* cited by examiner

*Primary Examiner* — Siu M Lee
(74) *Attorney, Agent, or Firm* — Leydig, Voit & Mayer, Ltd.

(57) ABSTRACT

A control unit generates pulse width modulation (PWM) pulses for an inverter. The control unit has a noise reducer configured to generate an opposing signal for active noise reduction. The noise reducer is configured to set a phase angle of the opposing signal based upon a predefined PWM frequency.

16 Claims, 1 Drawing Sheet

CONTROL UNIT FOR GENERATING PWM PULSES FOR AN INVERTER

CROSS REFERENCE TO RELATED APPLICATIONS

This application claims benefit to German Patent Application No. DE 10 2020 117 821.2, filed on Jul. 7, 2020, which is hereby incorporated by reference herein.

FIELD

The present invention relates to a control unit for generating pulse width modulation (PWM) pulses for an inverter, including for an inverter of a drive train, to a drive train having an electrical machine, to a method for operating a drive train, and to a motor vehicle.

BACKGROUND

Electrical machines in motor vehicles are typically fed with a three-phase alternating current, that is to say with three phase currents. In order to feed the electrical machine with the phase currents, an inverter provides alternating current (AC) voltages which result in phase currents. In this case, the AC voltages are generated by the inverter from a direct current (DC) voltage which is provided by an energy store.

The inverter typically has fast-switching semiconductor switches in order to convert the DC voltage into the AC voltages. These are used to set the desired resulting amplitudes and frequencies of the phase currents.

In this case, the semiconductor switches are controlled, for example, with pulse width modulation (PWM). The PWM frequency of the inverter is usually selected in this case in such a manner that the sum of the losses from the inverter and electrical machine becomes minimal depending on the operating point.

In order to improve the driving comfort of a motor vehicle having an electrical machine, it is useful to reduce noises. In addition to insulation measures, measures for active noise reduction are taken. The prior art discloses, for example, the practice of generating an opposing signal and processing it when controlling the semiconductor switches in order to reduce noise. In this case, the opposing signal is usually intended for a predefined, fixed PWM frequency. However, a change in the PWM frequency results, in practice, in impaired noise reduction and even noise amplification.

SUMMARY

In an embodiment, the present disclosure provide a control unit that generates pulse width modulation (PWM) pulses for an inverter. The control unit has a noise reducer configured to generate an opposing signal for active noise reduction. The noise reducer is configured to set a phase angle of the opposing signal based upon a predefined PWM frequency.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
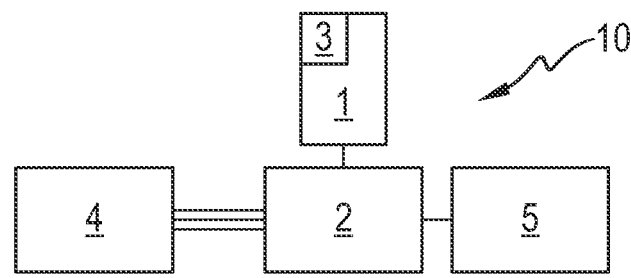
FIG. 1 schematically illustrates a drive train according to one exemplary embodiment of the present invention having a control unit according to one exemplary embodiment of the present invention.

Embodiments of the present invention is provide a control unit for generating PWM pulses for an inverter, which control unit does not have the mentioned disadvantages of the prior art, but rather enables improved reliable noise reduction.

An embodiment of the present invention provides a control unit for generating PWM pulses for an inverter, in particular an inverter of a drive train, having a noise reduction device (noise reducer) for generating an opposing signal for active noise reduction, wherein the noise reduction device is configured to set the phase angle of the opposing signal on the basis of a predefined PWM frequency.

The opposing signal deliberately generates additional forces in the electrical machine in addition to the existing tangential and radial forces. It has surprisingly been shown that, if the opposing signal alone is tuned to a PWM frequency, deviations of the optimum phase angles occur if the PWM frequency changes. The forces generated in the electrical machine are no longer exactly in phase opposition to the existing higher-order tangential and radial forces, and so the forces are not completely extinguished or are even amplified. The practice of setting the phase angle of the opposing signal corrects this and ensures phase opposition of the forces, the torque ripple and therefore the sound and anti-sound.

Advantageous configurations and developments of the invention can be gathered from the subclaims and the description with reference to the drawings.

One preferred embodiment of the invention provides for the noise reduction device to be configured to additionally set the phase angle of the opposing signal on the basis of a predefined speed, in particular a speed of an electrical machine of the drive train, and/or an order of the opposing signal. This allows the phase angle to be adapted very exactly to the present conditions.

The order of the opposing signal, in the sense of the present invention, denotes a multiple of the frequency of a physical variable, for example a multiple of the fundamental oscillation of the electrical phase current of the electrical machine. The phase angle may be set for each order for which the opposing function is generated. The second-order phase angle may be set on the basis of the setting of the first-order phase angle. The third-order phase angle may be set on the basis of the setting of the second-order phase angle. Therefore, for the phase angle of one order may be set on the basis of the setting of the phase angle of a lower order.

A further preferred embodiment of the invention provides for the noise reduction device to be configured to determine a gradient of the phase deviation at the speed on the basis of the PWM frequency and preferably the order of the opposing signal, in particular by means of a lookup table. This makes it possible to quickly and accurately set the phase angle. A lookup table, also LUT for short, in the sense of the present invention is a conversion table.

A further preferred embodiment of the invention provides for the noise reduction device to be configured to determine an offset angle on the basis of the PWM frequency and preferably the order of the opposing signal, in particular by means of a lookup table. The phase angle of the opposing signal can be set more accurately by considering an offset angle.

A further preferred embodiment of the invention provides for the noise reduction device to be configured to determine the phase angle of the opposing signal as:

$$\Delta\theta_{PWM} = \theta_{off} + \alpha_{PWM} \cdot p \cdot \omega_m,$$

where $\Delta\theta_{PWM}$ is the correction angle of the phase angle of the opposing signal, $\theta_{off}$ is the offset angle, $\alpha_{PWM}$ is the gradient of the phase deviation at the speed, $\omega_m$ is the mechanical speed, preferably of the rotor of the electrical machine, and p is the pole pair number, preferably of the electrical machine. It is possible to very accurately and quickly set the phase angle following the illustrated rule. Highly effective noise reduction is achieved as a result. Optionally, it is also possible to store another mathematical description for adapting the phase angle of the opposing signal on the basis of the speed, the PWM frequency, the ordinal number and the pole pair number of the electrical machine: $\Delta\theta_{PWM}$ ($\omega\_m$, _PWM, µ, p).

The invention also relates to a drive train having an electrical machine, an inverter and a control unit according to the invention. The electrical machine preferably has a three-phase design. The inverter preferably has SiC semiconductors and/or GaN semiconductors.

The invention also relates to a method for operating a drive train having an electrical machine, an inverter and a control unit which generates PWM pulses for the inverter, wherein a noise reduction device of the control unit generates an opposing signal for active noise reduction, wherein the noise reduction device sets the correction of the phase angle of the opposing signal on the basis of a predefined PWM frequency. The practice of setting the phase angle of the opposing signal corrects this and ensures phase opposition of the sound and anti-sound.

A further preferred embodiment of the invention provides for the phase angle of the opposing signal to be additionally set on the basis of a predefined speed, in particular a speed of the electrical machine, and/or an order of the opposing signal. This allows the phase angle to be adapted very exactly to the present conditions. It phase angle of one order may be set on the basis of the setting of the phase angle of a lower order.

A further preferred embodiment of the invention provides for a gradient of the phase deviation at the speed to be determined on the basis of the PWM frequency and preferably the order of the opposing signal, in particular by means of a lookup table. This makes it possible to quickly and accurately set the phase angle.

A further preferred embodiment of the invention provides for an offset angle to be determined on the basis of the PWM frequency and preferably the order of the opposing signal, in particular by means of a lookup table. The phase angle of the opposing signal can be set more accurately by considering an offset angle.

A further preferred embodiment of the invention provides for the phase angle of the opposing signal to be determined as:

$$\Delta\theta_{PWM} = \theta_{off} + \alpha_{PWM} \cdot p \cdot \omega_m,$$

where $\Delta\theta_{PWM}$ is the correction of the phase angle of the opposing signal, $\theta_{off}$ is the offset angle, $\alpha_{PWM}$ is the gradient of the phase deviation at the speed, $\omega_m$ is the speed and p is the pole pair number of the electrical machine. It is possible to very accurately and quickly set the phase angle following the illustrated rule. Highly effective noise reduction is achieved as a result.

A further preferred embodiment of the invention provides for the control unit to be a control unit described above as being according to the invention.

The invention also relates to a motor vehicle having a drive train according to the invention.

All details, features and advantages disclosed above in connection with the control unit likewise relate to the drive train according to the invention, the method according to the invention and the motor vehicle according to the invention.

FIG. 1 schematically shows a drive train 10 according to one exemplary embodiment of the present invention having a control unit 1 according to one exemplary embodiment of the present invention. The drive train 10 has, for example, a three-phase electrical machine 4 which is fed with phase currents by an inverter 2. For this purpose, the inverter 2 converts a DC voltage, which is provided by an energy store 5, into AC voltages, the application of which to terminals of the electrical machine 4 results in the phase currents.

For this purpose, the inverter 2 has a plurality of semiconductor switches, preferably SiC and/or GaN semiconductor switches. The semiconductor switches are controlled by a control device 1 by means of pulse width modulation (PWM). During operation of the electrical machine 4, unpleasant background noise typically arises. In order to reduce this, the control unit 1 has a noise reduction device 3. The noise reduction device 3 is used to generate an opposing signal for active noise reduction. During active noise reduction, sound which arises is reduced or suppressed by generating anti-sound. The anti-sound is produced here by introducing additional forces into the electrical machine. In this case, the anti-sound ideally corresponds, in terms of frequency and amplitude, to the sound with a phase offset of 180°.

The prior art discloses the practice of generating the opposing signal for fixed PWM frequencies. It has been shown that, when the PWM frequency changes, not only the frequency but also the amplitude of the opposing signal have to be changed. The invention provides for the noise reduction device 3 to set a phase angle (see FIG. 2) of the opposing signal on the basis of the PWM frequency. This allows considerably more efficient noise suppression by means of the generated opposing signal.

Figure 2:
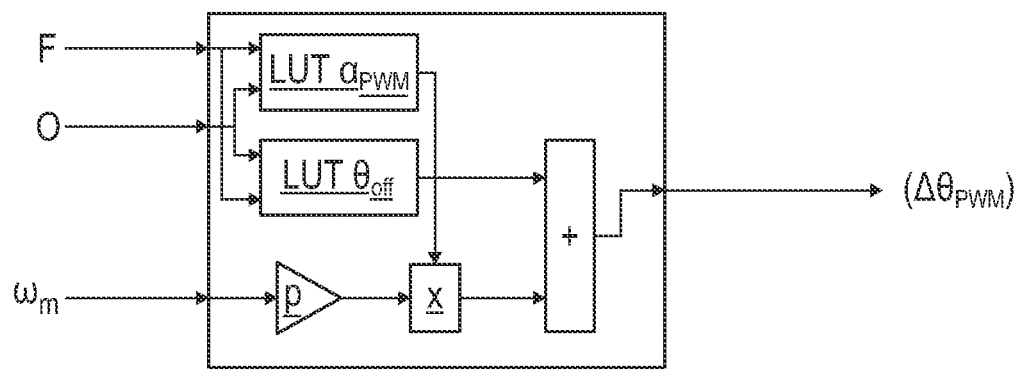
FIG. 2 schematically illustrates the process of setting the phase angle in a method according to one exemplary embodiment of the present invention.

FIG. 2 schematically shows the process of setting the phase angle $\Delta\theta_{PWM}$ in a method according to one exemplary embodiment of the present invention. For this purpose, a gradient $\alpha_{PWM}$ of the phase deviation is looked up in a lookup table LUT on the basis of the PWM frequency F and the order O of the opposing signal. Furthermore, an offset angle $\Theta_{off}$ is looked up in a further lookup table LUT on the basis of the PWM frequency F and the order O of the opposing signal.

The gradient $\alpha_{PWM}$ of the phase deviation is multiplied by a speed $\omega_m$ of the rotor of the electrical machine 4, which speed is amplified in proportion to the pole pair number p of the electrical machine. The result of the multiplication is added to the offset angle $\Theta_{off}$ and results in the phase angle $\Delta\theta_{PWM}$ of the opposing signal.

Figure 3:
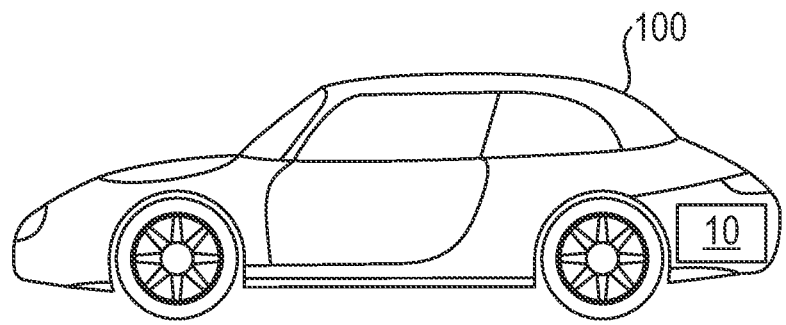
FIG. 3 schematically illustrates a motor vehicle according to one exemplary embodiment of the present invention.

FIG. 3 schematically illustrates a motor vehicle 100 according to one exemplary embodiment of the present invention. The motor vehicle 100 has a drive train 10 according to one exemplary embodiment of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A control unit for generating pulse width modulation (PWM) pulses for an inverter, the control unit comprising a noise reducer configured to generate an opposing signal for active noise reduction, wherein the noise reducer is configured to set a phase angle of the opposing signal based upon a predefined PWM frequency.

2. The control unit as claimed in claim 1, wherein the noise reducer is configured to set the phase angle of the opposing signal based upon a predefined speed or an order of the opposing signal.

3. The control unit as claimed in claim 2, wherein the predefined speed is a speed of an electrical machine of a drive train.

4. The control unit as claimed in claim 1, wherein the noise reducer is configured to determine a gradient of a phase deviation at a speed of an electric machine based on the predefined PWM frequency.

5. The control unit as claimed in claim 4, wherein the noise reducer is configured to determine the gradient of the phase deviation at the speed of the electric machine based on the predefined PWM frequency and an order of the opposing signal using a lookup table.

6. The control unit as claimed in claim 1, wherein the noise reducer is configured to determine an offset angle based upon the predefined PWM frequency.

7. The control unit as claimed in claim 1, wherein the noise reducer is configured to determine the phase angle of the opposing signal as:

$$\Delta\theta_{PWM}=\theta_{off}+\alpha_{PWM}p\cdot\omega_m,$$

where $\Delta\theta_{PWM}$ is a correction of the phase angle of the opposing signal, $\theta_{off}$ is an offset angle, $\alpha_{PWM}$ is a gradient of a phase deviation at a speed, $\omega_m$ is a mechanical speed, and p is a pole pair number.

8. The control unit as claimed in claim 7, wherein $\omega_m$ is the mechanical speed, of a rotor of an electrical machine, and p is the pole pair number of the electrical machine.

9. A drive train comprising an electrical machine, the inverter and the control unit as claimed in claim 1.

10. A motor vehicle comprising the drive train as claimed in claim 9.

11. The control unit as claimed in claim 1, wherein the noise reducer is configured to determine an offset angle based upon the predefined PWM frequency and an order of the opposing signal, using a lookup table.

12. A method for operating a drive train having an electrical machine, an inverter and a control unit which generates pulse width modulation (PWM) pulses for the inverter, the method comprising:

a noise reducer of the control unit generating an opposing signal for active noise reduction, wherein the noise reducer sets a correction of a phase angle of the opposing signal based upon a predefined PWM frequency.

13. The method as claimed in claim 12, the method comprising setting the phase angle of the opposing signal is based on a speed the electrical machine, or an order of the opposing signal.

14. The method as claimed in claim 12, the method comprising determining a gradient of a phase deviation at a speed based upon the predefined PWM frequency.

15. The method as claimed in claim 12, that the method comprising determining an offset angle based upon the predefined PWM frequency.

16. The method as claimed in claim 12, that the method comprising determining the phase angle of the opposing signal as according to:

$$\Delta\theta_{PWM}=\theta_{off}+\alpha_{PWM}p\cdot\omega_m,$$

where $\Delta\theta_{PWM}$ is a correction of the phase angle of the opposing signal, $\theta_{off}$ is an offset angle, $\alpha_{PWM}$ is a gradient of a phase deviation at a speed, $\omega_m$ is a speed and p is a pole pair number of the electrical machine.

* * * * *